US005701546A

United States Patent [19]
Shimomura et al.

[11] Patent Number: 5,701,546
[45] Date of Patent: Dec. 23, 1997

[54] PARALLEL INTERFACE CIRCUIT HAVING A N-BYTE BUFFER AND TANSMITTING THE N BYTE DATA ON A BYTE-BY-BYTE BASIS IN RESPONSE TO INTERRUPT REQUEST SIGNAL

[75] Inventors: Haruyuki Shimomura, Nagoya; Toshiki Narukawa, Kasugai, both of Japan

[73] Assignee: Brother Kogyo Kabushiki Kaisha, Nagoya, Japan

[21] Appl. No.: 280,539

[22] Filed: Jul. 26, 1994

[30] Foreign Application Priority Data

Aug. 6, 1993 [JP] Japan ................................. 5-196486

[51] Int. Cl.[6] .................................................. G06F 13/00
[52] U.S. Cl. .................. 395/849; 395/309; 395/821; 395/855; 395/872
[58] Field of Search ............................ 375/377; 395/250, 395/281, 307, 309, 439, 879, 886, 823, 850, 821, 855, 872

[56] References Cited

U.S. PATENT DOCUMENTS

| | | | |
|---|---|---|---|
| 4,291,370 | 9/1981 | Charles | 395/307 |
| 4,390,967 | 6/1983 | Eglowstein et al. | 395/281 |
| 4,447,878 | 5/1984 | Kinnie et al. | 395/307 |
| 4,509,113 | 4/1985 | Heath | 395/886 |
| 4,534,011 | 8/1985 | Andrews et al. | 395/250 |
| 4,535,404 | 8/1985 | Shenk | 395/879 |
| 4,918,597 | 4/1990 | Krishnan et al. | 395/309 |
| 4,941,157 | 7/1990 | Taylor | 375/377 |
| 4,947,366 | 8/1990 | Johnson | 395/823 |
| 5,123,091 | 6/1992 | Newman | 395/850 |
| 5,394,534 | 2/1995 | Kulakowski et al. | 395/439 |
| 5,459,858 | 10/1995 | Lyon et al. | 395/600 |

*Primary Examiner*—Thomas C. Lee
*Assistant Examiner*—Po C. Huang
*Attorney, Agent, or Firm*—Oliff & Berridge

[57] ABSTRACT

An n-byte buffer is able to store n bytes of data. A interrupt request signal generating circuit interrupts the processor of the peripheral apparatus after receiving the nth byte of the data. Accordingly, only one interrupt operation is needed to receive and input n bytes of data. Consequently, the number of interrupt operations is reduced and the data processing speed is improved.

20 Claims, 3 Drawing Sheets

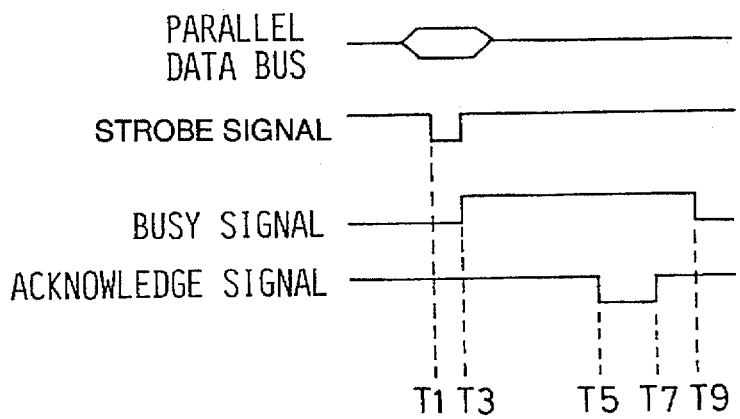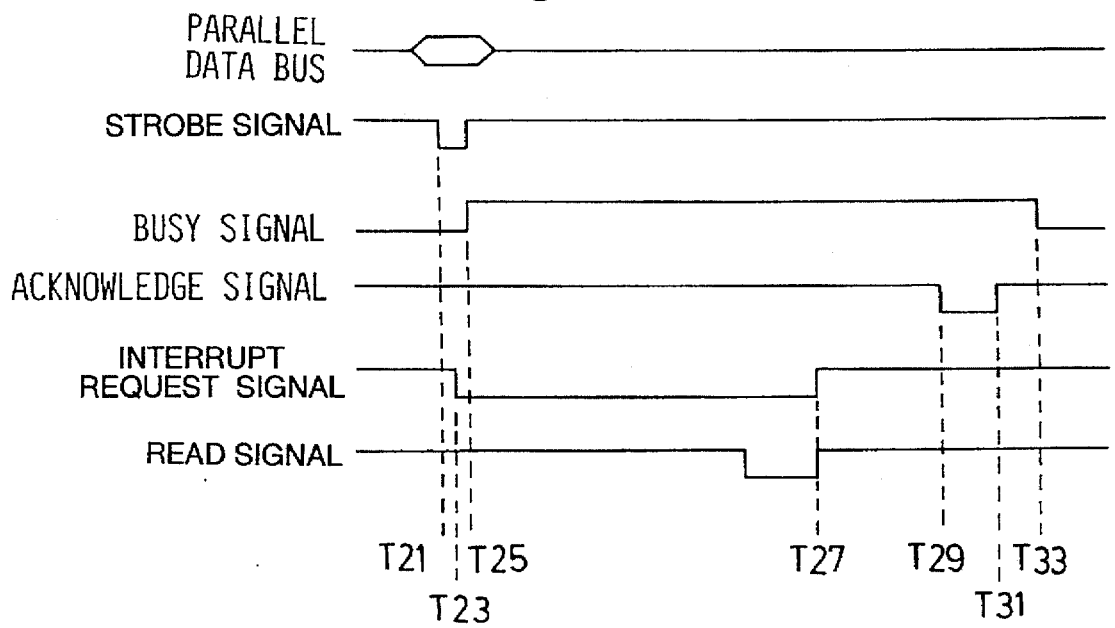

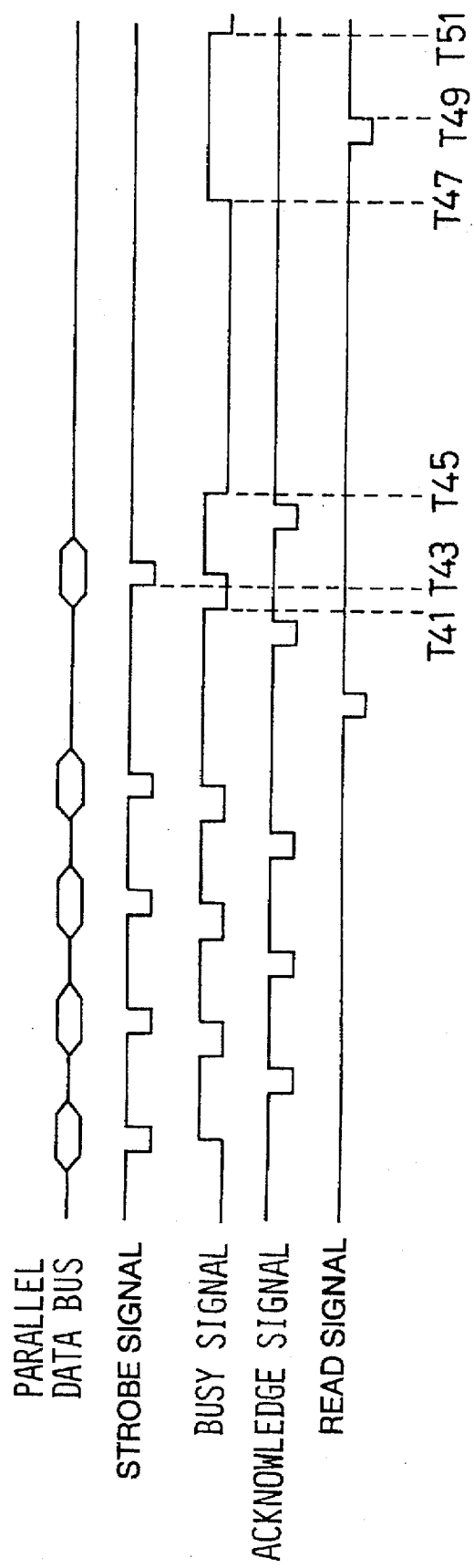

PARALLEL INTERFACE CIRCUIT HAVING A N-BYTE BUFFER AND TANSMITTING THE N BYTE DATA ON A BYTE-BY-BYTE BASIS IN RESPONSE TO INTERRUPT REQUEST SIGNAL

BACKGROUND OF THE INVENTION

1. Field of the Invention

This invention relates to a parallel interface circuit for communicating data between a external host computer and a processor of a peripheral apparatus. Specifically, this invention relates to using the parallel interface circuit with an internal C.P.U. in a information processing apparatus such as a printer, the parallel interface circuit provided in the information processing apparatus. More particularly, this invention relates to a parallel interface circuit providing improve receiving data speed.

2. Description of the Related Art

Heretofore, a parallel interface circuit, provided, for example, in a printer, a calculator, an office automation machine, etc., for providing data communication between an external host computer and an internal C.P.U. in an information processing apparatus is well known. The internal C.P.U. receives data from the external host computer through this conventional parallel interface circuit one byte at a time.

When a strobe signal is input, a receiving circuit of the information processing apparatus latches 1 byte of data, a interrupt request signal is input to the internal C.P.U., and a busy signal is output to the host computer. Subsequently, the internal C.P.U. receives the data from the host computer by executing an interrupt process, and then cancelling the busy signal and outputting a acknowledge signal to the host computer. Subsequent data bytes are received by repeating this process.

However, the information processing apparatus provided with the conventional parallel interface circuit is not able to receive data at high speed. Thus, the processing speed is low because the internal C.P.U. receives data from the host computer in 1 byte units. Information processing apparatus with improved processing speed appear in the market in succession with the progress of high speed technology of the internal C.P.U. Nevertheless, even if the width of the internal data bus of the information apparatus is 16 bits or 32 bits, because the reception unit at the parallel interface circuit can receive only a 1 byte unit, only 8 bits of the 16- or 32-bit-wide data bus are used and thus the internal data bus is not effectively used.

SUMMARY OF THE INVENTION

This invention thus overcomes the above and other deficiencies and disadvantages of the conventional parallel interface circuit, by providing a parallel interface circuit enabling speed high data reception.

According to one embodiment of the invention, a parallel interface circuit is provided in the information processing apparatus for communicating data between an internal C.P.U. of the information processing apparatus and an external host computer comprising: a handshake signal generating circuit generating a handshake signal indicating data reception corresponding to a strobe signal from the host computer; data storing means for storing more than two 1-byte units of data received from the host computer; an interrupt request signal generating circuit generating and outputting an interrupt request signal to the internal C.P.U. when the data stored in the data storing means fills the data storing means.

In a second embodiment of the invention, a parallel interface circuit as described above is provided, wherein said interrupt request circuit generates and outputs an interrupt request signal to the internal C.P.U. when the next byte of data is not stored within a predetermined time period from the time the current byte of data is stored in the data storing means, even if the received bytes of data do not fill the data stored means.

More generally, the parallel interface circuit can be used between the host computer and the peripheral processor of any peripheral device connectable to the host computer.

In the operation of the first embodiment of the invention, when the C.P.U. inside the information processing apparatus receives the data from the external host computer, the strobe signal is input to the parallel interface circuit from the host computer. Then, the handshake generating circuit generates the handshake signal, which indicates the reception of the data corresponding to the strobe signal, and outputs it to the host computer. Further, the data received from the host computer is stored in the data storing means, which has a storage capacity of at least 2 bytes. When the data stored in the data storing means reaches the capacity of the data storing means, the interrupt request circuit generates and outputs the interrupt request signal to the internal C.P.U.

For example, when the data storing means is capable of storing 4 bytes, the data is received sequentially from the host computer. Only after the 4th byte of the data is received does the interrupt request circuit starts to interrupt the internal C.P.U. Therefore, the internal C.P.U. receives all 4 bytes of the data at once.

Thus, only one interrupt operation is needed to receive and input 4 bytes of the data. Accordingly, the number of receiving operations is reduced and the speed of the data processing is improved. Moreover, in the conventional apparatus, the interrupt operation occurred after each byte of data was received, and after receiving the byte of data, the internal C.P.U. sent a handshake signal such as a busy signal or a acknowledge signal by a software procedure to the host device. However, the above apparatus of this invention sends only the handshake signal from the handshake generating circuit in response to the strobe signal until the fourth byte of the data is received. Thus, improvement in the data processing speed is achieved by this apparatus.

In the second embodiment of the invention, the interrupt request circuit generates and outputs an interrupt request signal to the internal C.P.U. when the next byte of data is not stored within a predetermined time period after the current byte of data was stored in the data storing means, even if the number of bytes of data received from the host computer doesn't fill the data storing means. When the internal C.P.U. sends the data after, for example, 4 bytes of data is stored in the data storing means, this second embodiment of the invention prevents the data processing speed from becoming low, by avoiding waiting for the next byte of data when only 1–3 bytes of data have been received from the host computer.

That is, after 1–3 bytes of data are stored, without the next byte of data being received, the interrupt operation of the internal C.P.U. is started once the predetermined time period elapses. Accordingly, for example, if 10 bytes of data are received, after the transmitting operations to the internal C.P.U, after the 4th and 8th bytes of data are performed, only 2 additional bytes of data are transmitted to the internal C.P.U. Thus, after the predetermined time period elapses, the interrupt process is performed, even if no data after the last 2 bytes of data is received or stored.

In other words, the parallel interface circuit of this embodiment generates and outputs the interrupt request signal to the C.P.U. even if the data storing means is not filled, when the next byte of data is not stored within the predetermined time period after the current byte of data is stored. By doing this, if the number of bytes of data from the host computer is not an exact multiple of n when using an n-byte data storage means, it prevents an unnecessary wait for the next byte of data and thus prevents unnecessarily delaying the data processing.

BRIEF DESCRIPTION OF THE DRAWINGS

The preferred embodiments of the present invention will be described in detail with the reference to the figures, wherein:

FIG. 2 is a timing chart indicating the operation of a parallel interface circuit when the 1st byte of the data is input;

FIG. 3 is a timing chart indicating the operation of a parallel interface circuit when the 4th byte of the data is input; and FIG. 4 is a timing chart indicating the operation of a parallel interface circuit when the 5th byte of the data is input.

DETAILED DESCRIPTION OF PREFERRED EMBODIMENTS

Figure 1:
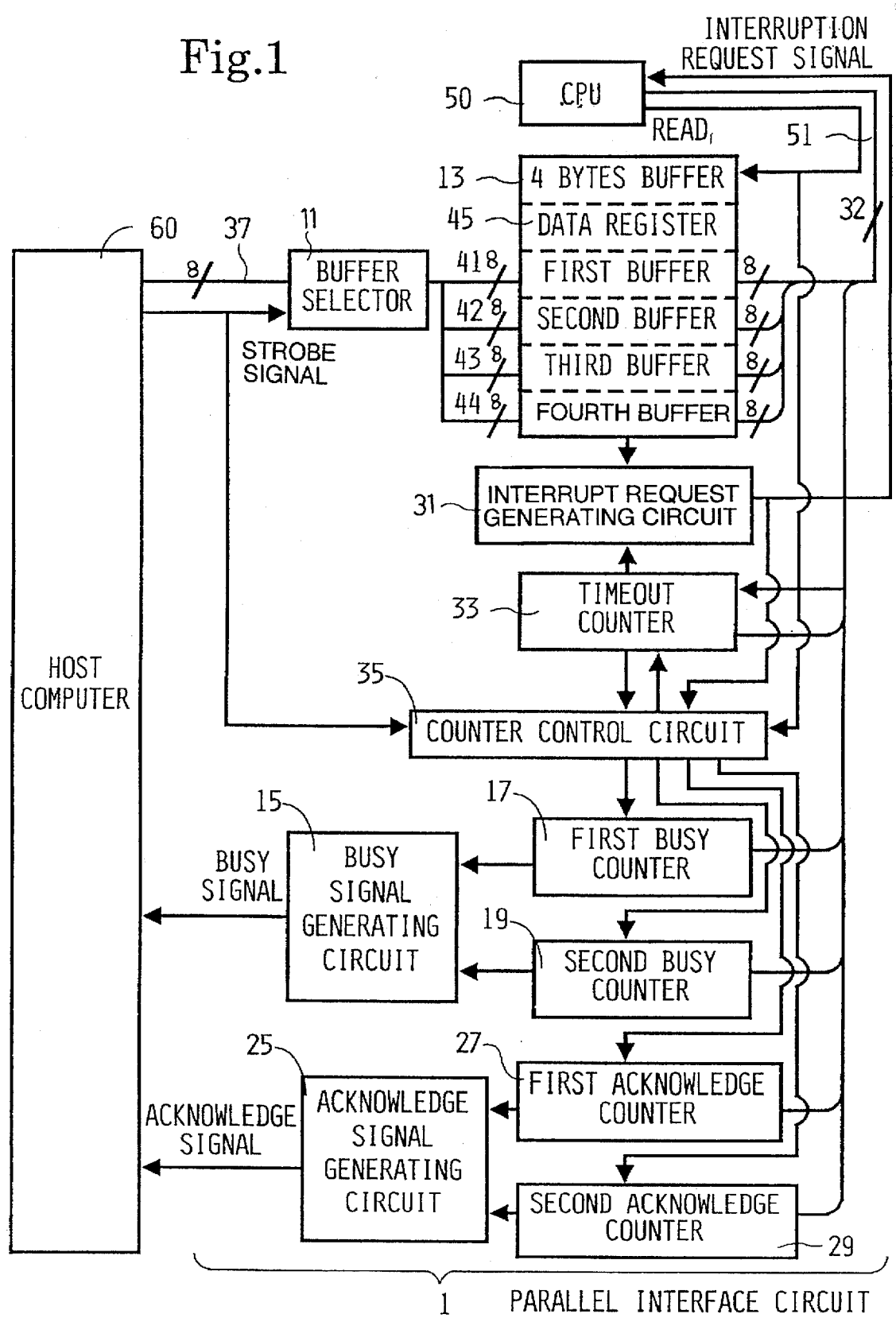
FIG. 1 shows a parallel interface circuit of this invention.

A preferred embodiment of the invention will now be described with reference to the accompanying drawings. FIG. 1 is a construction of a parallel interface circuit of the embodiment of this invention.

A parallel interface circuit 1 is provided in a information processing apparatus, such as a printer, to communicate data between a internal C.P.U. 50 of the information processing apparatus and an external host computer 60. The parallel interface circuit 1 comprises a buffer selector 11, a 4-byte buffer 13, a busy signal generating circuit 15, a first busy counter 17, a second busy counter 19, acknowledge signal generating circuit 25, a first acknowledge counter 27, a second acknowledge counter 29, an interrupt request signal generating circuit 31, a timeout counter 33 and a counter control circuit 35.

The buffer selector 11 is connected to the host computer 60 through a parallel data bus 37, and selects one byte of the 4-byte buffer 13 by the order of the data input from the host computer 60.

A strobe signal from the host computer 60 is input to the buffer selector 11 and a counter control circuit 35 when the host computer 60 wants to output a byte of data to the information processing apparatus. Then, a busy signal from the busy signal generating circuit 15 and an acknowledge signal from the acknowledge signal generating circuit 25 are sent as handshake signals to the host computer 60 signal to acknowledge receipt of the data byte from the host computer 60.

The busy signal generating circuit 15 is connected to the first busy counter 17 and the second busy counter 19. The acknowledge signal generating circuit 25 is connected to the first acknowledge counter 27 and the second acknowledge counter 29. These counters 17, 19, 27, 29 generate timing signals which change the busy signal and the acknowledge signal from "0" to "1" or from "1" to "0".

The 4-byte buffer 13 comprises first through fourth byte-buffers 41–43 which store data byte-by-byte and a data register 45 which indicates what byte number of the data is currently being input. This 4-byte buffer 13 is connected to the C.P.U. 50 through a 32-bit internal data bus 51. After all data inputs to the first through fourth byte-buffers 41–44 is completed, the 4-byte buffer 13 outputs a input complete signal to the interrupt request generating circuit 31.

The interrupt request signal to the C.P.U 50 is output by the interrupt request signal generating circuit 31. This interrupt request signal generating circuit 31 outputs the interrupt request signal to the C.P.U. 50 in response to either the input complete signal from the 4-byte buffer 13 or the time-out signal from the timeout counter 33. The timeout counter 33 causes data stored in the 4-byte buffer 13 to be sent to the C.P.U. when the data from the host computer 60 doesn't completely fill the 4-byte buffer 13. The starting timing of the counters 17, 19, 27, 29, 33 described above is controlled by the counter control circuit 35. The C.P.U. 50 can adjust a set-up time for counting.

The operation of the parallel interface circuit 1 having the above construction is described below. FIG. 2 is a timing chart indicating the operation of the parallel interface circuit 11 when the first byte of data is input.

At time T1, the strobe signal from the host computer 60 is input to the buffer selector 11, which writes the data present on the parallel data bus 37 into the first buffer 41 of the 4-byte buffer 13. The strobe signal is also input to the counter control circuit 35. The counter control circuit 35 starts all of the counters 17, 19, 27, 29, and 33 in response to the strobe signal.

At time T3, the busy signal generating circuit 15 changes the busy signal to "1" in response to the first busy counter 17 counting down to zero (or overflowing if the counter counts up instead of down). Then, at time T9, the busy signal generating circuit 15 changes the busy signal to "0" in response to the second busy counter 19 counting down to zero (or overflowing). Between times T3 and T9, the acknowledge signal generating circuit 25 changes the acknowledge signal to "0" in response to the first acknowledge counter 27 counting down to zero (or overflowing), and changes the acknowledge signal to "1" in response to the second acknowledge counter 29 counting down to zero (or overflowing).

The above description is a timing concerning the input operation of the first byte of the data. The timing concerning the input operation of the second and the third bytes of data is the same as the timing for the first byte. The only difference is that the buffer selector 11 writes the second byte of the data into the second buffer 42 of the 4-byte buffer 13 and the third byte of the data into the third buffer 43 of the 4-byte buffer 13. The data register 45 in the 4-byte buffer 13 is set to "1" when the first byte of data is input and is set to "2" when the second byte of data is input. Thus, the data register 45 always indicates how many current bytes of data are stored in the 4-byte buffer 13.

The input operation of the fourth byte of data is described with the reference to the accompanying timing chart shown in FIG. 3.

When the strobe signal is input from the host computer 60 at time T21, the buffer selector 11 writes the data present on the parallel data bus 37 into the fourth buffer 44 of the 4-byte buffer 13. Then, at time T23, interrupt request generating circuit 31 outputs an interrupt request signal to the C.P.U. 50 and to the counter control circuit 35 in response to the input complete signal from the 4-byte buffer 13. When the interrupt request signal is input, the counter control circuit 35 operates only the first busy counter 17.

The busy generating circuit 15 sets the busy signal to "1" and terminates the data input process when the first busy counter 17 counts down to zero (or overflows) at time T25. Then, the C.P.U. 50 enters the interrupt process in response to the interrupt request signal, outputs the read signal to the 4-byte buffer 11, and reads the 4 bytes of data from the 4-byte buffer 13 simultaneously at time T27. The read signal from the C.P.U. 50 is output to the timeout counter 33 and the counter control circuit 35. When the read signal is received, the timeout counter 33 is reset and the counter control circuit 35 operates the second busy counter 19, the first acknowledge counter 27 and the second acknowledge counter 29.

The busy generating circuit 15 sets the busy signal to "0" when the second busy counter 19 counts down to zero (or overflows) at time T33. The acknowledge generating circuit 25 sets the acknowledge signal to "0" when the first acknowledge counter 27 counts down to zero (or overflows) at time T29, and sets the acknowledge signal to "1" when the second acknowledge counter 29 counts down to zero (or overflows) at time T31.

The above mentioned description is the operation of the parallel interface circuit 1 when receiving the fourth data byte. However, it should be appreciated that the number of bytes sent from the host computer 60 does not have to be a multiple of 4. The operation of the parallel interface circuit 1 when the number of bytes of data received from the host computer 60 is not a multiple of 4 (for example, 5 bytes) will be described referring to FIG. 4.

As shown in FIG. 4, the parallel interface circuit 1 operates from the first byte to the fourth byte as described above mentioned (time T41). Next, when the strobe signal for the fifth data byte is input at time T43, the buffer selector 11 writes the data present on the parallel data bus 37 into the first buffer 41 of the 4-byte buffer 13. The counter control circuit 35 operates the all of the counters 17, 19, 27, 29 and 33.

Outputting of the busy signal and the acknowledge signal is terminated at time T45, when the second busy counter 19 counts down to zero (or overflows). In this case, since a sixth byte of data has not been input, the input complete signal from the 4-byte buffer 13 to the interrupt request generating circuit 31 is not output. Instead, when the timeout counter 33 counts down to zero (or overflows) a count termination (or time-out) signal is input to the interrupt request signal generating circuit 31. The interrupt request signal generating circuit 31 outputs the interrupt request signal to the C.P.U. 50 and the counter control circuit 35.

The counter control circuit 35 operates the first busy counter 17 by inputting the interrupt request signal. The busy signal generating circuit 15 sets the busy signal to "1" when the first busy counter 17 counts down (or overflows) at time T47. Later the C.P.U. 50 jumps to the interrupt routine in response to the interrupt request signal and outputs the read signal and reads the four bytes of data from the 4-byte buffer 13 at once at time T49. In contrast, once the fifth data byte is received, the data register 45 of the 4-byte buffer 13 is set to "1" and the C.P.U. 50 judges that only the first buffer 41 of the 4-byte buffer 13 stores current data. Accordingly, at time T49, only the fifth data byte of the data, which is stored in the first buffer 41, is read.

Then the counter control circuit 35 receives the read signal from the C.P.U. 50. At the time of the interrupt routine for the timeout counter 33, only the second busy counter 19 is operated. The busy signal generating circuit 15 sets the busy signal to "0" when the second busy counter 19 counts down (or overflows) at time T51. The timeout counter 33 generates the time-out signal when it counts down to zero (or overflows). The time-out counter 33 can begin counting after any event, including after the first busy counter 17 counts down, after the second busy counter 19 counts down, after the first acknowledge counter 27 counts down, after the second acknowledge counter 29 counts down, or after the counter control circuit 35 starts the counters, as in the preferred embodiment. The strobe signal input to the counter control circuit 35 causes the counter control circuit 35 to stop the time-out counter 33 and reset all of the counters 17, 19, 27, 29 and 33. The time-out counter 33 is also stopped when the read signal is output by the C.P.U. 50, or when the interrupt request signal generating circuit 31 outputs the interrupt request signal.

As described above, according to the this embodiment of the parallel interface circuit 1, only one interrupt operation is sufficient to receive 4 bytes of data. Accordingly, the number of receiving operations is reduced and the speed of data processing is improved. Moreover, in the conventional apparatus, the interrupt routine occurred after each data byte was received. After receiving the data, the internal C.P.U sent a handshake signal such as a busy signal or an acknowledge signal by software procedure. However the above apparatus adapted this invention need send only a handshake signal in response to the strobe signal, until the fourth data byte is received.

The conventional apparatus has an interrupt after each data byte reception. And after receiving the data, the internal C.P.U sends a handshake signal such as a busy signal and an acknowledge signal. In short, in the prior art, the operation after the fourth data byte of the this preferred embodiment is repeated after every byte. Instead, in this embodiment, after the first three data bytes, the busy signal generating circuit 15 or the acknowledge signal generating circuit 25 sends only the busy signal or the acknowledge signal in response to the strobe signal. Thus, an improvement in the data processing speed is achieved by hardware means.

Further, the parallel interface circuit 1 of this embodiment generates the interrupt request signal to the C.P.U, even if the data storing means is not filled, when the next byte is not stored within a predetermined time period after the previous data byte is stored. By doing this, when the number of the byte from the host computer is not a multiple of 4, the parallel interface circuit does not wait for the next data byte. Thus, the data processing is not unnecessarily delayed.

It should be understood that the invention is not restricted to the particular forms shown in the forgoing embodiment. Various modifications and alterations can be added thereto without departing from the scope and spirit of the invention encompassed by the appended claims. For example, this embodiment has a 4 byte buffer for storing 4 bytes of the data, but the buffer any number of data bytes.

According to this invention, only one interrupt operation is enough for receiving two or more bytes of the data. Accordingly the number of receiving operations is reduced and the speed of the data processing is improved. Further, when the number of bytes from the host computer is not multiple of the data storing amount, unnecessarily waiting for the next data and unnecessarily delaying the data processing is prevented.

What is claimed is:

1. A parallel interface for receiving parallel data for a peripheral processor output by an external host computer, comprising:

a handshake signal generating circuit generating a handshake signal in response to a byte of parallel data and a strobe signal output by the host computer, the handshake signal indicating to the external host computer reception of the byte of parallel data by the parallel interface;

data storing means for storing a predetermined number n of the bytes of parallel data received from the host computer, where n≥2; and an interrupt request signal generating circuit generating an interrupt request signal to the peripheral processor at least when the number of bytes of parallel data stored in the data storing means equals the predetermined number n;

wherein, when said data storing means receives a read signal from the peripheral processor in response to the interrupt request signal, the number of bytes of parallel data stored in the data storage means are simultaneously output in parallel to the peripheral processor.

2. The parallel interface circuit of claim 1, wherein said data storing means receives the strobe signal from the host computer and after receiving said strobe signal, said data storing means receives a next byte of data.

3. The parallel interface circuit of claim 1, wherein said data storing means comprises four byte buffers for storing 4 bytes of data.

4. The parallel interface circuit of claim 1, wherein the handshake signal generating circuit includes:

at least one of: a) a first busy counter and a second busy counter; and b) a first acknowledge counter and a second acknowledge counter; and a counter control circuit controlling, in response to the strobe signal, at least one of: a) the first busy counter, and the second busy counter; and b) the first acknowledge counter and the second acknowledge counter.

5. The parallel interface circuit of claim 1, wherein said interrupt request signal generating circuit outputs the interrupt request signal to the peripheral processor when a current number of bytes less than the predetermined number of bytes are stored in the data storing means and a next byte data is not received within a predetermined time period after a present byte of data is received and stored to the data storing means.

6. The parallel interface circuit of claim 5, further comprising a timeout control circuit for measuring the predetermined time period.

7. The parallel interface circuit of claim 5, wherein, when said data storing means receives the read signal from the peripheral processor in response to the interrupt request signal, the current number of bytes of parallel data stored in the data storage means are simultaneously output in parallel to the peripheral processor.

8. The parallel interface circuit of claim 1, wherein said handshake signal is at least one of a busy signal and an acknowledge signal.

9. The parallel interface circuit of claim 8, further comprising at least one of a busy signal generating circuit generating the busy signal and an acknowledge generating circuit generating the acknowledge signal.

10. A peripheral apparatus comprising:

an internal processor for controlling the peripheral apparatus;

an n-byte buffer connectable to a host computer and comprising n data buffers, where n≥2, the host computer outputting a byte of parallel data and a strobe signal a plurality of times, each data buffer storing one byte of the parallel data received from the host computer, the n-byte buffer storing the received byte of parallel data to one of the n data buffers in response to a corresponding strobe signal received from the host computer;

an interrupt request signal generating circuit generating an interrupt request signal; and a handshake generating circuit generating a handshake signal indicating reception of the byte of parallel data to be stored in said n-byte buffer to the host computer in response to the corresponding strobe signal, the host computer outputting a next byte of parallel data and a next strobe signal only in response to the handshake signal;

wherein, when said interrupt request signal generating circuit generates the interrupt request signal, the internal processor simultaneously inputs the bytes of parallel data stored in the n-byte buffer in parallel.

11. The peripheral apparatus of claim 10, wherein the peripheral apparatus is an image information processing apparatus.

12. The parallel interface circuit of claim 10, wherein the handshake signal generating circuit includes:

at least one of: a) a first busy counter and a second busy counter; and b) a first acknowledge counter and a second acknowledge counter; and a counter control circuit controlling, in response to the strobe signal, at least one of: a) the first busy counter and the second busy counter; and b) the first acknowledge counter and the second acknowledge counter.

13. The peripheral apparatus of claim 10, wherein said interrupt request signal generating circuit generates and outputs the interrupt request signal to the internal processor when the next byte of data is not received from the host computer within a predetermined time period after a current byte of data is stored in the n-byte buffer.

14. The peripheral apparatus of claim 13, wherein said handshake signal is at least one of a busy signal and an acknowledge signal.

15. The peripheral apparatus of claim 14, further comprising at least one of a busy signal generating circuit generating the busy signal and an acknowledge generating circuit generating the acknowledge signal.

16. The parallel interface circuit of claim 13, wherein, when the internal processor inputs the parallel data stored in the n-byte buffer in response to the interrupt request signal, the current number of bytes of parallel data stored in the n-byte buffer are simultaneously output in parallel to the internal processor.

17. A method for inputting bytes of data output from a host computer on a byte-by-byte basis using a parallel interface circuit, the method comprising:

inputting a strobe signal from the host computer;

receiving and storing a byte of parallel data into a current byte buffer of an n-byte buffer, said n-byte buffer comprising n byte buffers, where n≥2;

outputting a handshake signal indicating reception of the byte of parallel data to the host computer;

repeating the inputting, receiving, storing, and outputting steps until n bytes of the parallel data have been stored in the n-byte buffer;

sending an interrupt request signal to a peripheral processor; and simultaneously transmitting the n bytes of parallel data stored in the n-byte buffer in parallel to the peripheral processor in response to the interrupt request signal.

18. The method for inputting bytes of data using the parallel interface circuit of claim 17, wherein said sending step comprises at least one of the steps of:
- generating and outputting the interrupt request signal to the internal processor when a next byte data is not transmitted from the host computer within a predetermined time period after a current byte of data is stored in the n-byte buffer; and
- generating the interrupt request signal after receipt of the nth data byte.

19. The method for inputting bytes of data using a parallel interface circuit of claim 17, wherein said outputting step comprises generating at least one of a busy signal and a acknowledge signal.

20. The method for inputting bytes of data using a parallel interface circuit of claim 17, further comprising the step of outputting a second handshake signal indicating reception of data to the host computer after the transmitting step.

* * * * *